(12) United States Patent
Kawai

(10) Patent No.: US 7,944,095 B2
(45) Date of Patent: May 17, 2011

(54) LINEAR MOTOR WITH INTEGRALLY FORMED STATOR

(75) Inventor: Yoichi Kawai, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 12/718,555

(22) Filed: Mar. 5, 2010

(65) Prior Publication Data

US 2010/0225180 A1    Sep. 9, 2010

(30) Foreign Application Priority Data

Mar. 6, 2009  (JP) .................................. 2009-053518

(51) Int. Cl.
    *H02K 41/03*    (2006.01)
(52) U.S. Cl. ................. 310/12.15; 310/12.24; 310/12.25
(58) Field of Classification Search ............... 310/12.15, 310/12.31, 12.27, 12.11, 12.17, 12.18
    See application file for complete search history.

(56) References Cited

U.S. PATENT DOCUMENTS

| | | | | |
|---|---|---|---|---|
| 3,699,365 | A * | 10/1972 | Leitgeb | 310/12.18 |
| 4,972,108 | A * | 11/1990 | Venturini | 310/12.22 |
| 5,536,983 | A * | 7/1996 | Araki et al. | 310/12.19 |
| 6,087,742 | A * | 7/2000 | Maestre | 310/12.24 |
| 6,441,515 | B1 * | 8/2002 | Shimura | 310/12.19 |
| 7,154,198 | B2 * | 12/2006 | Kawai | 310/12.15 |
| 7,242,117 | B2 * | 7/2007 | Sugita et al. | 310/12.15 |
| 7,339,290 | B2 * | 3/2008 | Sugita et al. | 310/12.15 |
| 2003/0141768 | A1 * | 7/2003 | Kim | 310/12 |
| 2006/0012251 | A1 * | 1/2006 | Miyata et al. | 310/12 |
| 2006/0076839 | A1 * | 4/2006 | Kawai | 310/12 |
| 2008/0001481 | A1 | 1/2008 | Miyaji et al. | |
| 2009/0218893 | A1 * | 9/2009 | Kawai | 310/12.24 |
| 2010/0225180 | A1 * | 9/2010 | Kawai | 310/12.26 |

FOREIGN PATENT DOCUMENTS

| JP | 08317627 | * 11/1996 |
|---|---|---|
| JP | 11308850 | * 11/1999 |
| JP | 2007-318839 | 12/2007 |

OTHER PUBLICATIONS

Esp@cenet patent abstract for Japanese Publication No. 2007318839, Publication date Dec. 6, 2007 (1 page).

* cited by examiner

Primary Examiner — Karl I Tamai
(74) Attorney, Agent, or Firm — Osha • Liang LLP

(57) ABSTRACT

A linear motor assembly includes two stators extending in parallel and having salient poles arranged at a predetermined interval on opposing surfaces and a mover having three types of mover blocks. The mover blocks are made up of three-phase alternating current coils configuring magnetic poles of three phases and permanent magnets arranged in alternating polarities on two surfaces of the mover blocks opposing each of the two stators. The mover blocks are movable between the two stators along a direction in which the stators extend. A plurality of linear motors are arranged in parallel with respect to a travel direction of the movers, and the stators provided between adjacent movers are integrally formed such that they have said salient poles on the two surfaces opposing these movers.

4 Claims, 11 Drawing Sheets

SIDE-A

LINEAR MOTOR WITH INTEGRALLY FORMED STATOR

CROSS-REFERENCE TO RELATED APPLICATIONS

This application claims priority to Japanese Patent Application No. 2009-53518, filed on Mar. 6, 2009, which is incorporated herein by reference in its entirety.

BACKGROUND OF THE INVENTION

1. Field of the Invention

The present invention relates to linear motors used in industrial machines such as machine tools.

2. Description of the Related Art

Linear motors have conventionally been used in industrial machines such as machine tools for realizing high-speed and high-accuracy. Among such linear motors, there are some that have realized low cost particularly in long-stroked machines by disposing expensive permanent magnets on the mover side and thus allowing the use of fewer permanent magnets. (For example, see Japanese Patent Laid-Open Publication No. 2007-318839 below.) An example of a conventional linear motor will be explained with reference to FIGS. 7 through 9. FIG. 7A is a diagram showing a schematic structure of a conventional linear motor, and FIG. 7B and C show arrangements of permanent magnets. FIG. 8 is a sectional diagram of the linear motor in FIG. 7A taken along a line C-C. FIG. 9 is a connecting diagram of coils wound in a linear motor.

A linear motor has two stators 52a, 52b extending in parallel and a mover 51 movable between the stators 52a, 52b along a direction in which the stators 52a, 52b extend.

The stators 52a, 52b are formed by laminating magnetic steel sheets. The stators 52a, 52b have salient poles 50 on surfaces opposing each other at a predetermined pitch, at pitch P, for example. Further, the stators 52a, 52b are prepared in a predetermined length L as shown in FIG. 7A. A plurality of stators 52a, 52b are disposed along the stroke of the mover 51 in a traveling direction of the mover 51. The stators 52a, 52b are fixed, for example, on a base 72 of a machine tool (shown in FIG. 8). Specifically, as shown in FIG. 8, the stators 52a, 52b are fixed by a bolt 71 such that a bottom face 74 of the stator contacts the base 72.

On the other hand, the mover 51 is movably supported in the X-axis direction in FIG. 7 by a rolling guide or the like provided between the base 72 and a table (now shown) and fixed to the table. The mover 51 has mover blocks 53, 54, 55 formed by laminating magnetic steel sheets. The mover block 53 is a mover block for the U-phase, the mover block 54 is a mover block for the W-phase, and the mover block 55 is a mover block for the V-phase. The mover blocks 53, 54, 55 are arranged such that they are relatively displaced by 120°, that is, by one third of the pole pitch P of the stators 52a, 52b, in the X-axis direction which is the direction of travel of the mover 51. A part of the mover blocks 53, 54, 55 are in some cases mechanically connected to each other in order to maintain dimensional accuracy between the blocks.

Three-phase alternating current coils are wound around each of the mover blocks 53, 54, 55. That is, a three-phase alternating current coil 56 for the U-phase is wound around the mover block 53, a three-phase alternating current coil 57 for the W-phase is wound around the mover block 54, and a three-phase alternating current coil 58 for the V-phase is wound around the mover block 55, respectively. The mover blocks 53, 54, 55 around which the three-phase alternating current coils 56, 57, 58 are wound are integrally formed by a mold resin 76.

Permanent magnets 59, 64 are arranged on the surface of the mover blocks 53, 54, 55 such that N and S poles alternate. Specifically, as shown in FIGS. 7B, C, three pairs of permanent magnets, a pair comprising an N and an S, are arranged at a pitch P. Here, as shown in FIG. 7A, supposing that the stator 52a side is SIDE-A and the stator 52b side is SIDE-B, the permanent magnets 59 on the SIDE-A and the permanent magnets 64 on the SIDE-B are arranged such that the polarity as seen from the SIDE-A is opposite to the polarity as seen from the SIDE-B.

The three-phase alternating coils 56, 57, 58 are connected in a star connection as shown in FIG. 9. As shown in FIG. 7A, for example, when a current is applied to the three-phase alternating current coils 56, 57, 58 from U in the directions of V and W, a magnetic flux 62 is excited in the linear motor.

Now, the operation of the linear motor will be described. When current is applied to the three-phase alternating current coils 56, 57, 58, the mover blocks 53, 54, 55 are excited in the positive direction or in the negative direction on the Y-axis (refer to FIG. 7A). At that time, out of the permanent magnets 59, 64, magnetic flux of the permanent magnets arranged in the same magnetization direction as the direction in which the alternating current coils is excited will be strengthened. On the other hand, magnetic flux of the permanent magnets arranged in the opposite direction of the direction in which the alternating coils is excited will be weakened. Accordingly, the permanent magnets 59 and 64 will be excited such that the polarities will be opposite to each other, that is, one will serve as the N pole and the other will serve as the S pole. Magnetic fluxes having passed through the respective mover blocks 53, 54, 55 and the stator 52a, 52b sides form a flux path as shown by reference numeral 62 in FIG. 7A. At this time, magnetic attractive force is generated depending on the positions of the mover 51 and the stators 52a, 52b, generating thrust in the mover 51, resulting in a movement of the mover 51.

The magnetic flux flow will now be explained in further detail. Suppose that current is directed from the U-phase to the V and W-phases, that is, in the winding direction shown in FIG. 7A in the case of three-phase alternating current coil 56 and in the opposite direction of the winding direction shown in FIG. 7A in the case of three-phase alternating current coils 57, 58. As a result, the SIDE-A becomes the S-pole and the SIDE-B becomes the N-pole in the case of the mover block 53. In contrast, in the case of mover blocks 54, 55, the SIDE-A becomes the N-pole and the SIDE-B becomes the S-pole. Consequently, as shown in FIG. 7A, a magnetic path 62 is formed such that the magnetic flux from the mover block 53 passes through the stator 52b to the mover blocks 54, 55, then through the stator 52a and back to the mover block 53. As a result, magnetic attractive force in the X-axis direction acts on the mover 51 and therefore thrust is generated.

SUMMARY OF THE INVENTION

However, the above-mentioned conventional linear motors had drawbacks as described below.

Heavy workpieces need to be driven when driving a table of a large machine tool. A large thrust is often obtained by using a plurality of movers 51. In that case, it may be possible to arrange a plurality of linear motors in parallel in the travel direction of the mover 51, that is, in the Y-axis direction in FIG. 7A so as to increase thrust. However, the installation area of the linear motors in the Y-axis direction becomes large as a result of arranging a plurality of linear motors in parallel in the Y-axis direction. This causes a problem that the linear motors do not fit into a machine space.

Further, as is disclosed in Japanese Patent Publication No. 2007-31 8839, the stators are prepared in a predetermined length L and a plurality of stators are disposed along the stroke of the mover in the direction of travel thereof. At this time, adjacent stators are arranged such that a slight clearance is formed in a boundary portion formed therebetween. This is to allow removal of only a target stator for replacement in the case where chips from cutting enter an air gap between a mover and a stator, for example, and the stator located at the center of the stroke breaks. However, since magnetic flux passes through the clearance in the boundary portion while the linear motor is in operation, magnetic resistance increases in that clearance. In the case where a mover is located between two adjacent boundary portions, that is, when a mover is located on the inside of both ends of a stator, there is no increase of magnetic resistance due to a magnetic flux passing through a clearance in the boundary portion, since a magnetic flux does not pass through the boundary portion. However, when the mover 51 passes through the boundary portion 101 as shown in FIG. 7A, the magnetic flux 62 passes through the boundary portion 101, and magnetic resistance increases due to the clearance in the boundary portion 101. There is a problem that thrust ripple is generated, since the magnetic flux intensity of the magnetic flux 62 varies depending on the position of the mover 51.

As shown in FIG. 8, the stators 52a, 52b of the linear motor are fixed to a base 72. Specifically, a stator bottom face 74 corresponding to the lower surfaces of the stators 52a, 52b is fixed so as to be in contact with a base 72. However, there is a problem that the rigidity of the stators 52a, 52b is low since a stator top face 73 corresponding to the upper surfaces of the stators 52a, 52b is not fixed. Particularly, in the case of conventional linear motors having stators 52a, 52b that are constructed by laminating magnetic steel sheets, the magnetic steel sheets are laminated in a direction perpendicular to a magnetic attractive force. As a result, a force working in the direction to cause lateral displacement acts on the magnetic steel sheets, making rigidity of the stators 52a, 52b particularly low.

Further, in such stators 52a, 52b, since only the stator top face 73 is bent by the magnetic attractive force, the air gap between the mover 51 and the stators 52a, 52b becomes narrow only at the stator top face 73. Further, pieces of the stators 52a, 52b are arranged in the travel direction of the mover 51, and the rigidity of each of the stators 52a, 52b varies depending on the lamination states of the magnetic steel sheets. Accordingly, the air gap between the mover 51 and the stators 52a, 52b varies depending on the position of the stator 52a, 52b. As a result, there is a drawback that the motor thrust varies depending on the positions of the stators 52a, 52b.

Yet further, in a conventional linear motor, electricity is applied to three-phase alternating current coils 56, 57, 58 disposed on the mover 51 side to excite the stators 52a, 52b via the air gap. Since the magnetic resistance of the air gap is high, the smaller the air gap, the higher the thrust. However, since stators 52a, 52b bend as mentioned above, the air gap needs to be predetermined taking into consideration the amount of bending. Consequently, the air gap must be made wider than desired, resulting in a problem that the motor thrust is reduced. Still further, from the aspect of motor control, gain must be increased to improve feedback controllability. However, increased gain causes the stators with low rigidity to vibrate. This leads to a problem that positional error becomes large due to the fact that the gain cannot be increased up to a desired level, resulting in a deteriorated level of machine tool accuracy and machined surface quality The present invention aims to solve at least one of the drawbacks, and one purpose of the present invention is to provide a linear motor capable of attaining as small an installation area as possible when a multiple number of linear motors are disposed in parallel with respect to the travel direction of a mover.

Another purpose of the invention is to provide a linear motor capable of reducing thrust ripple generated depending on the position of a mover in the case where a plurality of linear motors are disposed in parallel with respect to the travel direction of a mover.

Yet another purpose of the present invention is to provide a linear motor capable of preventing variation in motor thrust that occurs depending on the position of a stator.

Still another purpose of the present invention is to provide a linear motor capable of improving motor thrust.

Another purpose of the present invention is to provide a linear motor capable of improving accuracy of machining tools and machined surface quality.

SUMMARY OF THE INVENTION

A linear motor of the present invention comprises two stators extending in parallel and having salient poles arranged at a predetermined interval on opposing surfaces, a mover having three types of mover blocks made up of three-phase alternating current coils configuring magnetic poles of three phases and permanent magnets arranged in alternating polarities on two surfaces of the mover blocks opposing each of the two stators, and movable between the two stators along a direction in which the stators extend, wherein a plurality of linear motors are arranged in parallel with respect to a travel direction of the mover, and the two stators provided between adjacent movers are integrally formed such that they have the salient poles on the two surfaces opposing these movers.

The linear motor may further include a base contacting a bottom face of the stator for fixing the stator, two stator installation members provided outside of outermost stators located on the outer side in a perpendicular direction with respect to the travel direction of the mover, the outermost stators being stators of two linear motors on an outermost side of the plurality of linear motors arranged in parallel, the two stator installation members extending up to a height substantially matching a height from the base to a top face of the outermost stators, and two plate-like supporting members connected and fixed to a top face of the outermost stators and a top face of the two stator installation members. The outermost stator may be fixed to the base on a bottom face thereof, and may be fixed to the stator installation member via the plate-like supporting member on a top face thereof.

Further, the stators of two linear motors on the outermost side of the plurality of linear motors arranged in parallel and located on the outer side in a perpendicular direction with respect to the travel direction of the mover may have the same shape as the integrally formed stators.

Yet further, the integrally formed stators are stators of two linear motors located on the outermost side of a plurality of linear motors arranged in parallel, and may be formed such that a width thereof in the direction perpendicular to the travel direction of the mover is made smaller than the outermost stator located on the outer side with respect to the travel direction of the mover.

According to the linear motor of the present invention, it is possible to attain as small an installation area as possible and it is also possible to reduce thrust ripple generated depending on the position of a mover in the case where a plurality of linear motors are disposed in parallel with respect to the travel direction of a mover. Also, it is possible to prevent the motor thrust from varying depending on the position of the stator. Further, since it is possible to install the air gap between the stator and the mover at a predetermined pitch, it is possible to improve motor thrust. Still further, with regard to the aspect of motor control, improvement in rigidity will allow increase in gain which leads to improvement of controllability of feedback control, thereby reducing positional error, which will then lead to improvement in precision of machine tools and machined surface quality.

DESCRIPTION OF PREFERRED EMBODIMENTS

Hereinafter, embodiments of a linear motor according to the present invention will be explained with reference to the drawings. Explanation will now be given of linear motors arranged in two rows parallel to the travel direction of a mover, as an example. The present invention is not limited to linear motors arranged in two rows but is also applicable to linear motors arranged in multiple rows.

Figure 1:
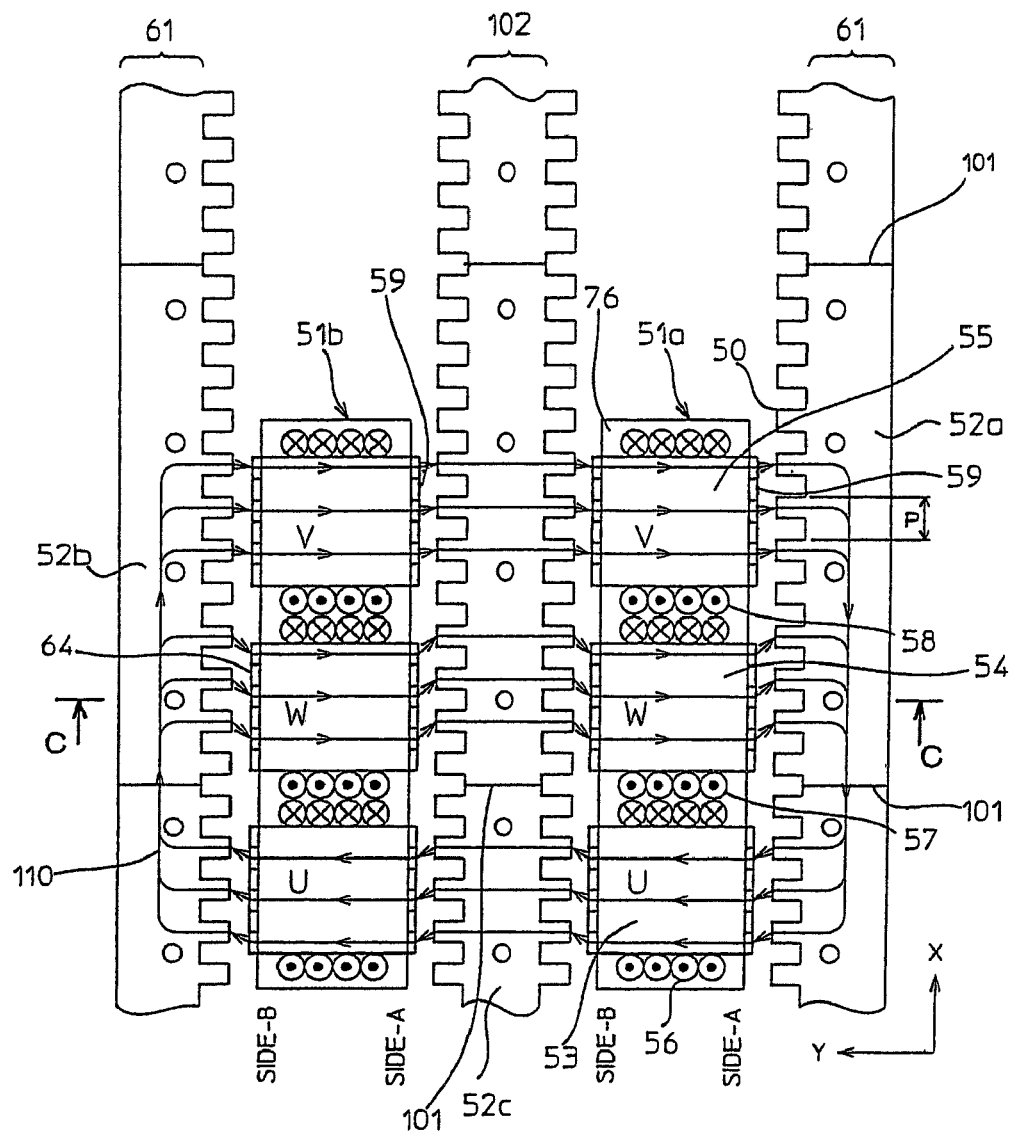
FIG. 1 is a diagram showing a schematic construction of a linear motor according to the present embodiment.
Figure 2:
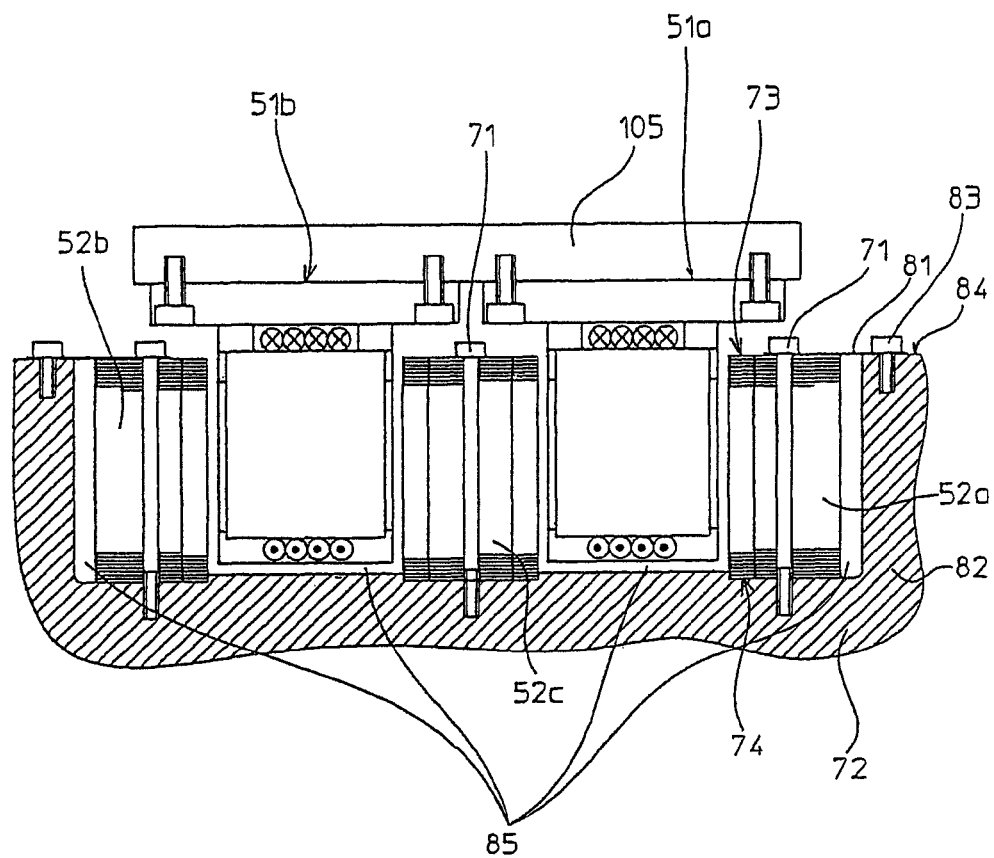
FIG. 2 is a diagram showing an installation structure of a linear motor according to the present embodiment.
Figure 3:
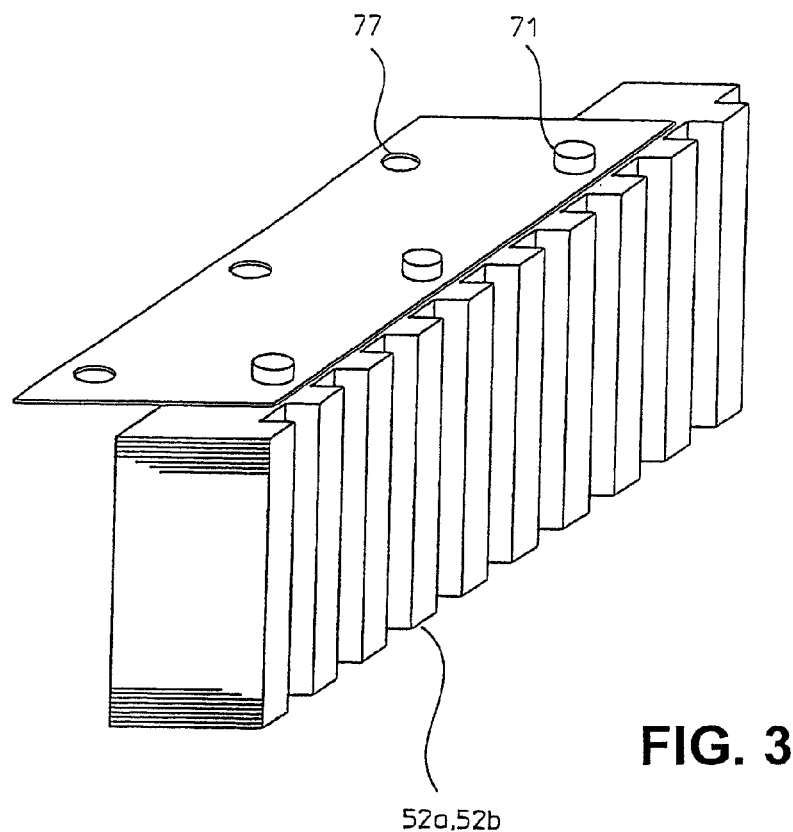
FIG. 3 is a perspective view of a stator.

FIG. 1 is a diagram showing a schematic construction of a linear motor according to the present embodiment. FIG. 2 is a drawing showing an installation structure of a linear motor according to the present embodiment. FIG. 3 is a perspective view of a stator. Here, construction that is similar to the linear motor explained as a related art will be denoted by similar reference numerals, and detailed description thereof will be omitted.

First, the installation structure of a linear motor will be explained. The cross-sectional shape of a base 72 is U-shaped. In FIG. 2, reference numerals of the respective parts of the base 72 represent the following. That is, 85 represents a U-shaped groove formed in the base 72, 82 represents a U-shaped groove surface wall formed in a side wall of the base 72, and 84 represents a U-shaped end portion, in other words, a base top face corresponding to the top face of the base 72. The base top face 84 is formed such that the height thereof is substantially the same as the height of the stator top face 73. A plate-like supporting member 81 in the form of a flat plate is disposed so as to form a bridge over the base top face 84 and the stator top face 73 of the stators 52a, 52b located on the outside of the linear motor in the Y-direction (refer to FIG. 1) (hereinafter simply referred to as the outermost stator). A plurality of bolt holes 77 are formed in the plate-like supporting member 81 as shown in FIG. 3. The plate-like supporting member 81 is fixed to the base top face 84 by a bolt 83, and the plate-like supporting member 81 is fixed to the stator top face 73 of the outermost stators 52a, 52b by a bolt 71. Consequently, the outermost stators 52a, 52b are fixed to the bottom of the U-shaped groove 85 of the base 72 via a bolt 71, while it is fixed to the base top face 84 of the base 72 via the plate-like supporting member 81 fixed to the stator top face 73. While the present embodiment had been described with reference to the case where the outermost stators are the stators located on the outside of the linear motor in the Y-direction (refer to FIG. 1), in the case of two or more rows of linear motors arranged in parallel, the outermost stator refers to the stators of the two linear motors located on the outermost side of the plurality of linear motors arranged in parallel and located on the outside in the Y-direction, respectively.

As described above, since the stator top face 73 of the outermost stators 52a, 52b is supported by the base top face 84 via the plate-like supporting member 81, magnetic attractive force acting between the mover 51a and the outermost stator 52a and between the mover 51b and the outermost stator 52b prevents the outermost stators 52a, 52b from bending toward the movers 51a, 52b, respectively. Accordingly, the air gap formed between the mover 51a and the outermost stator 52a, and that formed between the mover 51b and the outermost stator 52b, may be maintained constant between the stator top face 73 to the stator bottom face 74. Also, since the stator top face 73 of the outermost stators 52a, 52b is fixed to the base 72 by the plate-like supporting member 81, rigidity of the outermost stators 52a, 52b increases. As a result, it will be possible to prevent the motor thrust from varying depending on the positions of the outermost stators 52a, 52b. Further, since it is possible to provide the air gap formed between the mover 51a and the outermost stator 52a, and that formed between the mover 51b and the outermost stator 52b, at a predetermined clearance, it will no longer be necessary to set a wider air gap in consideration of bending of the outermost stators 52a, 52b, and the motor thrust will thereby improve. Also, in terms of motor control, increased rigidity will increase gain, which will in turn improve feedback controllability, which will then reduce positional error, leading to improved accuracy of machine tools and machined surface quality.

Figure 4:
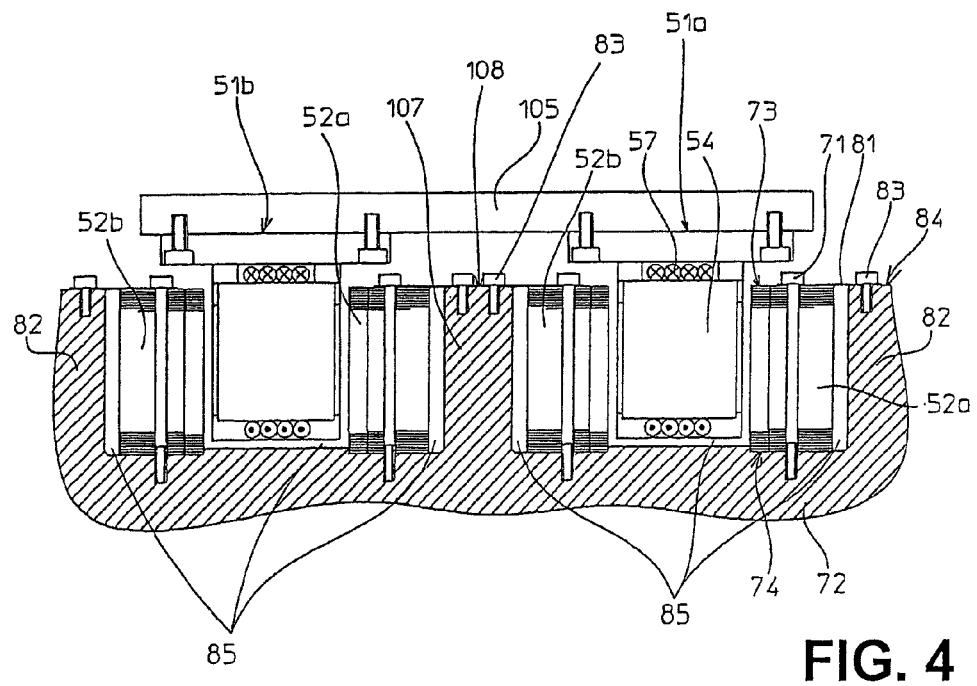
FIG. 4 is a diagram of two linear motors disposed in parallel with respect to the travel direction of a mover.

In the case of arranging a plurality of linear motors of the prior art in parallel with respect to the travel direction of the mover by using such a configuration, it would be necessary to provide a U-shaped groove side surface wall 107 between adjacent linear motors, as shown in FIG. 4, for fixing the stator top face 73 via the plate-like supporting member 81. By doing so, however, the installation area of the linear motors may become too large such that the linear motors do not fit into the space for the machine. Also, the base top face 108 shown in FIG. 4 requires a wide machining range in the case of a machine with a longer stroke, which would require numerous tapping for fixing more bolts 83, resulting in high machining cost, which is a problem.

In order to solve such a problem, the linear motor of the present embodiment is characterized in that two stators provided between adjacent movers 51a, 51b are integrally formed. Integrally formed integral stators will be hereinafter referred to as the integral stator 52c. The integral stator 52c is characterized by having salient poles 50 on the respective two surfaces opposing the movers 51a, 51b. The integral stator 52c is fixed to the base 72 by the bolts 71, as shown in FIG. 2.

In a linear motor thus constructed, the integral stator 52c has formed thereon salient poles 50 on the two surfaces opposing the movers 51a, 51b such that the magnetic attractive force acting between the mover 51a and the integral stator 52c and that acting between the mover 51b and the integral stator 52c are equivalent but act in opposite directions, therefore cancelling out the magnetic attractive forces. Accordingly, it is possible to prevent the integral stator 52c from bending toward the movers 51a, 51b, respectively, and therefore it is possible to attain the advantage mentioned in the foregoing paragraph. Further, since magnetic attractive force does not act on the integral stator 52c only in one direction toward the movers 51a, 51b as in the case with the outermost stators 52a, 52c, it would be unnecessary to fix the integral stators 52c to the U-shaped groove side surface wall 107 via the plate-like supporting member 81, as shown in FIG. 4. Consequently, it would be unnecessary to provide a U-shaped groove side surface wall 107 between adjacent linear motors, whereby installation area of plural linear motors arranged in parallel with respect to the travel direction of the mover 51 may be made small.

Further, the installation area of the linear motor according to the present embodiment may be made even smaller when arranging plural linear motors in parallel with respect to the travel direction of the mover 51. Specific description will be given hereafter.

As shown in FIG. 1, the linear motor will be excited by a magnetic flux 110 when electrical current is applied to the three-phase alternating current coils 56, 57, 58 of the movers 51a, 51b from U to the directions of V and W. At this time, the magnetic flux 110 is generated at a stator yoke 61 of the outermost stators 52a, 52b from mover blocks 54, 55 to the mover block 53. Accordingly, the width of the stator yoke 61 or the length of the stator yoke 61 in the Y-direction needs to be selected such that magnetic flux saturation does not occur.

However, in the case of the integral stator 52c, as shown in FIG. 1, the magnetic flux 110 is generated in the Y-direction perpendicular to the travel direction of the movers 51a, 51b. The width of the stator yoke 102 having a length corresponding to the length in the travel direction of the movers 51a, 51b will be ensured. Accordingly, magnetic saturation will not occur at the stator yoke 102, and therefore it will be possible to make the width of the stator yoke 102 smaller than the total length obtained by adding the width of the stator yoke 61 of the outermost stator 52a and the width of the stator yoke 61 of the outermost stator 52b. Consequently, a smaller width of the stator yoke 102 can be obtained with the integral stator 52c than in the case of simply integrating two stators provided between adjacent movers 51a, 51b, thereby further reducing the installation area of the linear motor.

Figure 7A:
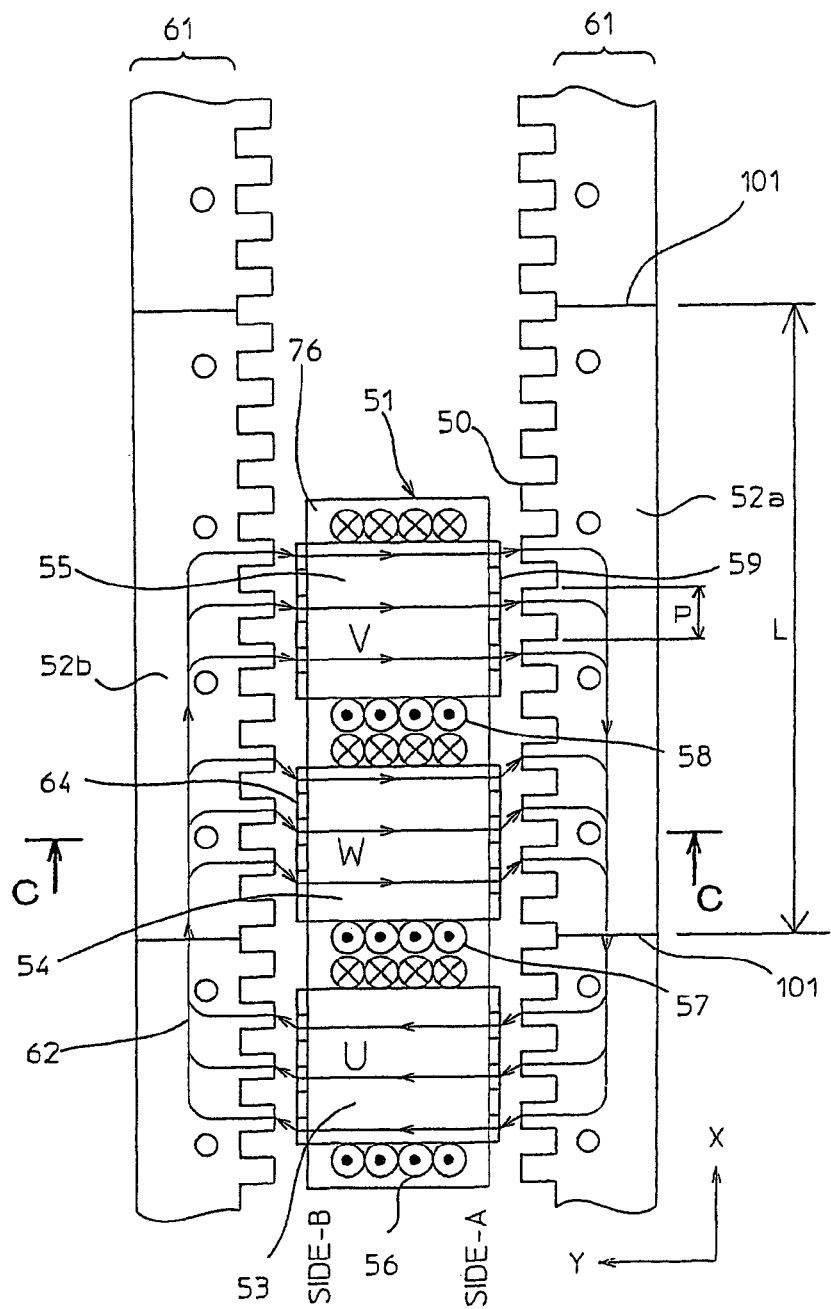
FIG. 7A is a diagram showing a schematic construction of a conventional linear motor.

In the linear motor of the prior art, as shown in FIG. 7A, the stators 52a, 52b are made in a predetermined length L and a plurality of such stators 52a, 52b are disposed along the stroke of the mover 51 in the travel direction of the mover 51. At this time, if a clearance is provided in the boundary portion 101 between the adjacent stator 52a and the adjacent stator 52b, the magnetic flux 62 will pass through this clearance, thereby increasing the magnetic resistance. When the mover 51 passes the position where the boundary potion 101 is located in the X-axis direction, the magnetic flux 62 passes the boundary portion 10, whereby the magnetic resistance is increased. On the other hand, in the case where the mover 51 does not pass the position where the boundary 101 is located in the X-axis direction, the magnetic flux 62 does not pass the boundary portion 10, which results in low magnetic resistance. In this way, there had been a drawback that thrust ripple becomes large due to variation of the magnetic flux 62 generated inside the stators 52a, 52b depending on the position of the mover 51.

In a linear motor configured as described above, the direction of generation of the magnetic flux 110 generated inside the integral stator 52c is in the Y-direction which is perpendicular to the travel direction of the movers 51a, 51b. Consequently, the magnetic flux 110 generated at the stator yoke 102 of the integral stators 52c does not pass the boundary portion 101 of the integral stator 52c. Accordingly, variation in the magnetic resistance of the stator yoke is reduced and the thrust ripple is reduced compared to the case where a plurality of prior art linear motors are arranged in parallel with respect to the travel direction of the mover. For example, in the case where two linear motors are arranged in two rows with respect to the travel direction of the mover 51, variation of magnetic resistance of the stator yoke 61, 102 in the linear motor of the present invention becomes one half compared to a prior art linear motor, whereby thrust ripple is reduced. Further, the more linear motors are disposed with respect to the travel direction of the mover 51, the more integral stators 52c are disposed between the movers 51, the integral stators 52c generating magnetic flux 110 in the direction perpendicular to the travel direction of the mover 51, thus resulting in higher thrust ripple reduction effect.

Figure 5:
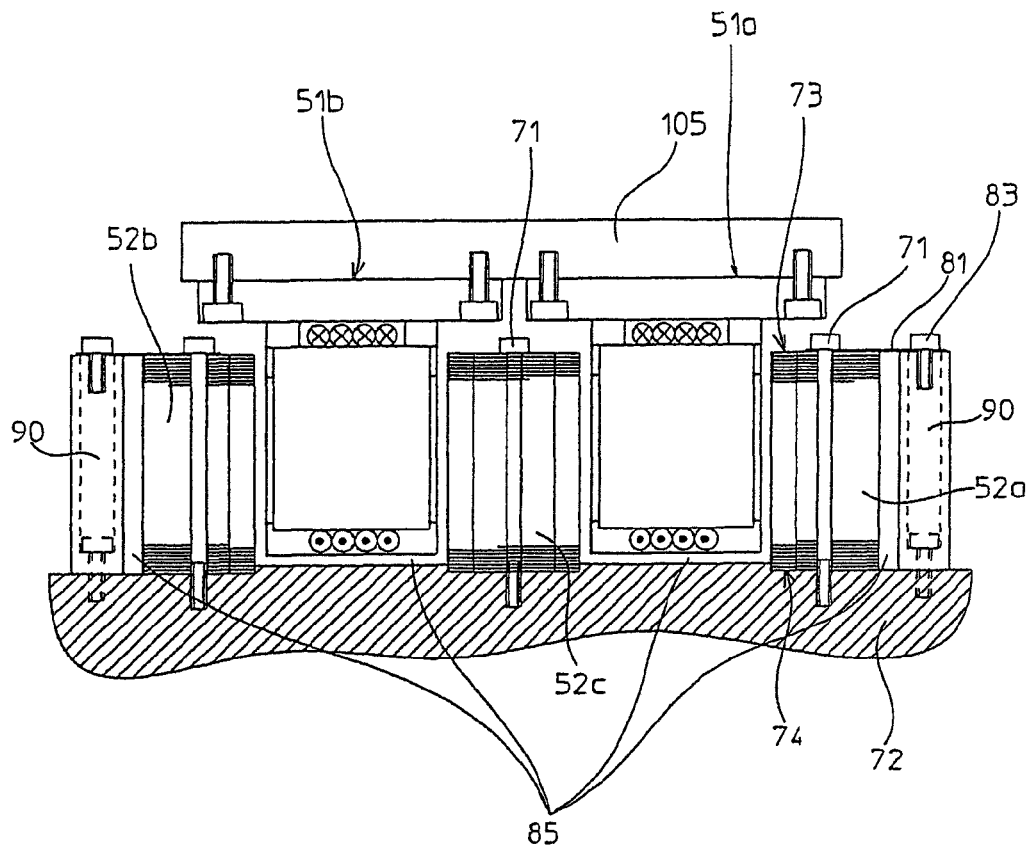
FIG. 5 is a diagram showing another installation structure of a linear motor according to another embodiment.

FIG. 5 shows an installation structure of a linear motor of another embodiment. While the U-shaped groove side surface wall 82 in FIG. 1 had been formed by cutting into a part of the base 72, in FIG. 5, a U-shaped cross-section is formed by fixing a stator installation member 90 to the base 72 by a bolt. As a result, the outermost stators 52a, 52b are installed on the top face of the stator installation member 90 via the plate-like supporting member 81, whereby similar effects to those obtained by the linear motor of the aforementioned embodiment can be obtained.

Further, although not shown, it would be possible to reduce the costs of jigs such as a die for making the stator 52, by making the shapes of the outermost stators 52a, 52b in FIG. 1 the same as that of the integral stator 52c. However, in this case, the size of the width of the stator yoke 102 of the integral stator 52c needs to be made the same as that of the stator yoke 61 of the outermost stators 52a, 52b, which slightly increases the installation area of the linear motor.

While the salient poles 50 of the stators 52a, 52b, 52c shown in FIG. 1 are all in the same positions in the X-axis direction, it is possible to obtain the same effect as that with the present invention even if not all the salient poles 50 are in the same positions. The reason for this will be described below.

Figure 6A:
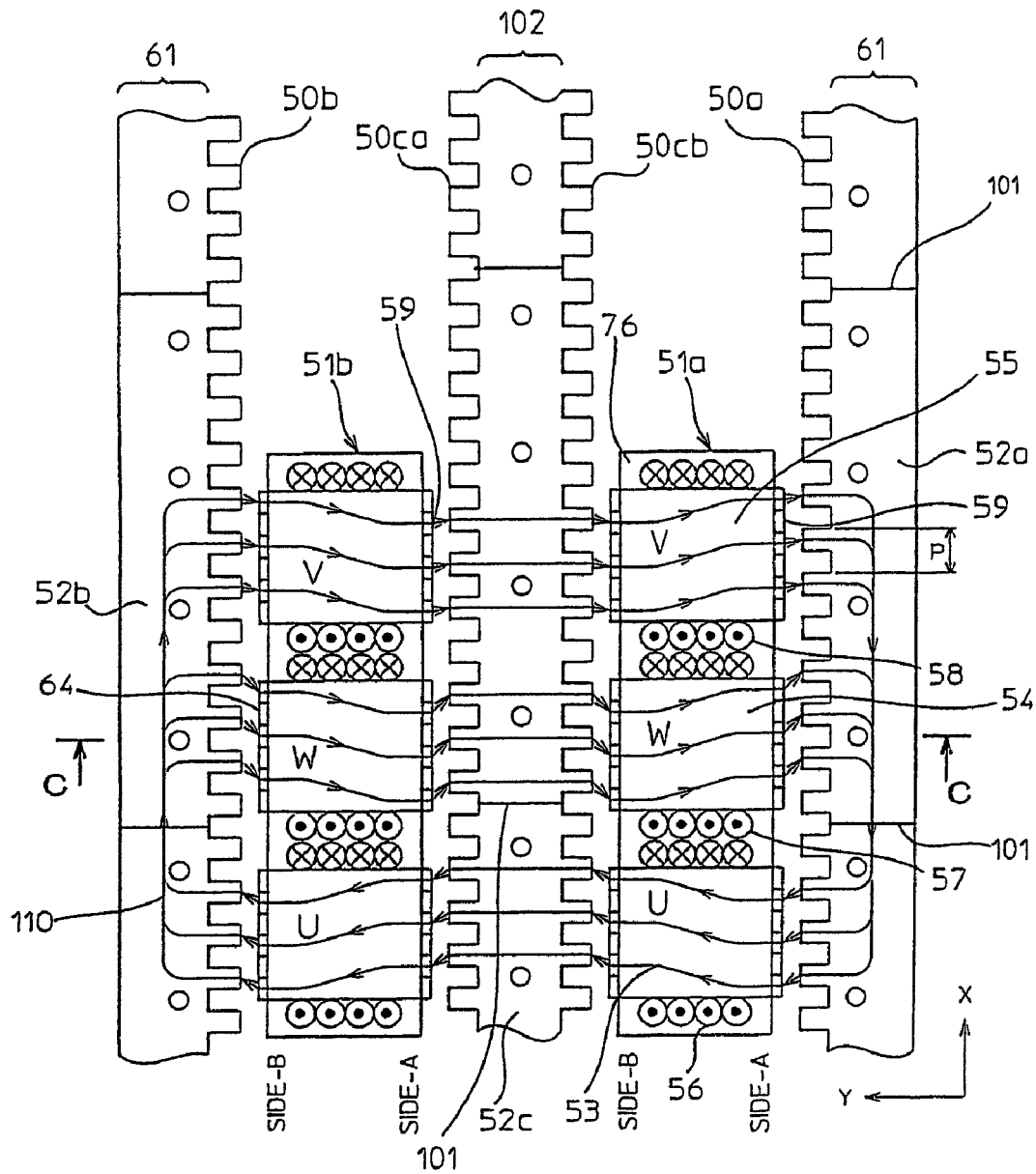
FIG. 6A is a diagram showing an example of a construction of a linear motor with different salient pole positions to which the present invention has been applied.
Figure 6B:
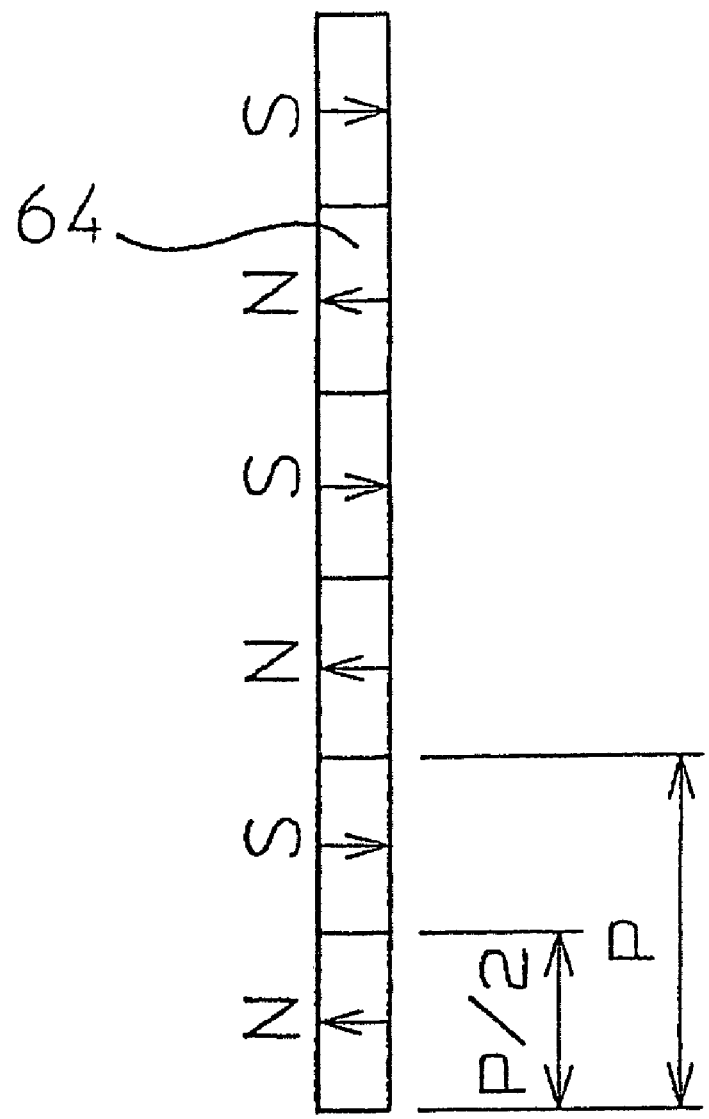
FIG. 6B shows arrangements of the permanent magnets.
Figure 6C:
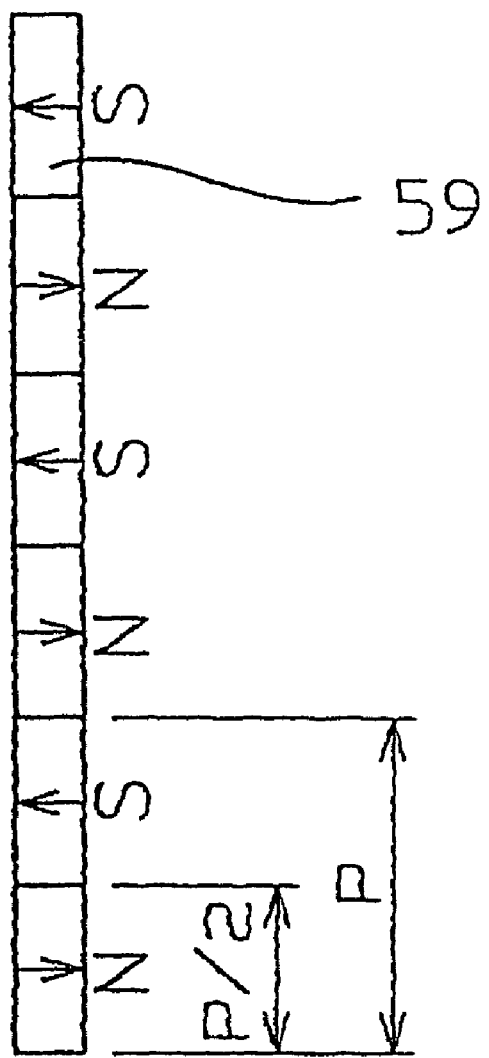
FIG. 6C shows arrangements of the permanent magnets.
Figure 7B:
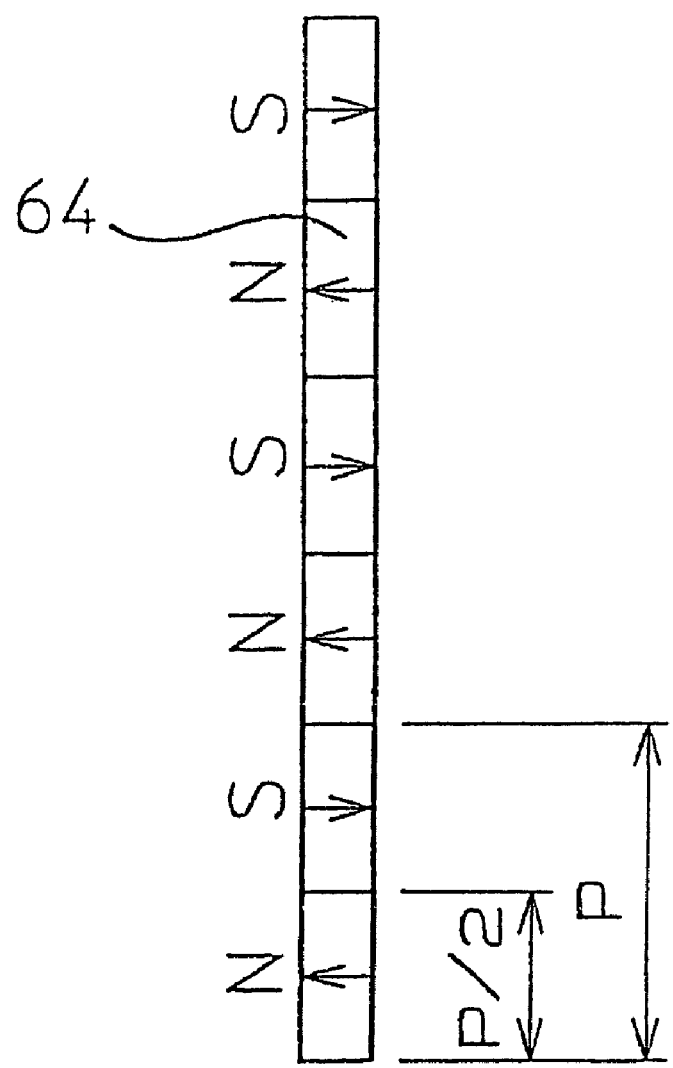
FIG. 7B is a diagram showing arrangements of the permanent magnets.
Figure 7C:
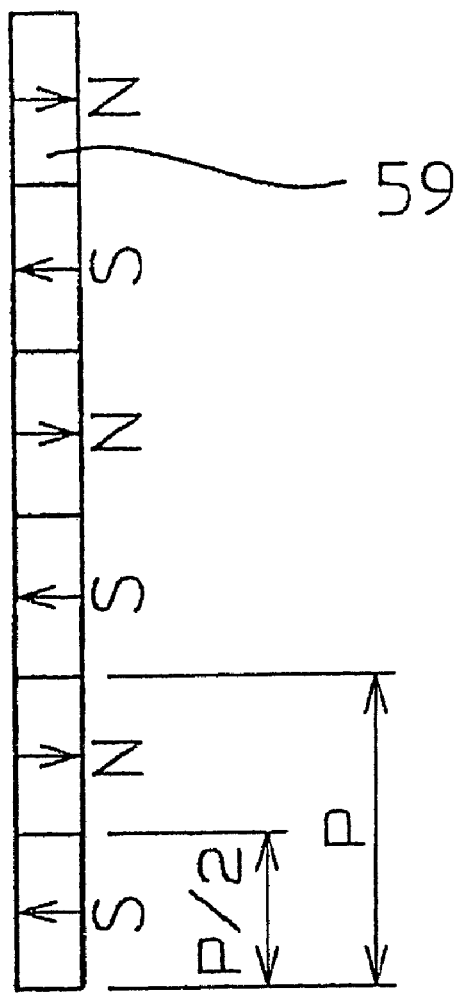
FIG. 7C is a diagram showing arrangements of the permanent magnets.
Figure 8:
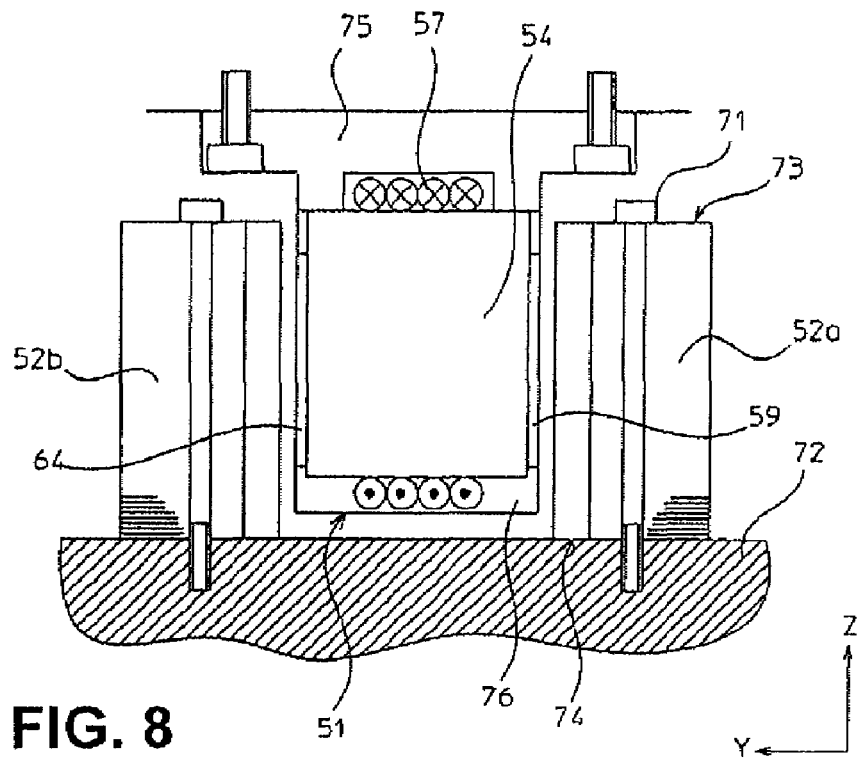
FIG. 8 is a sectional view taken along a line C-C in FIG. 7A.
Figure 9:
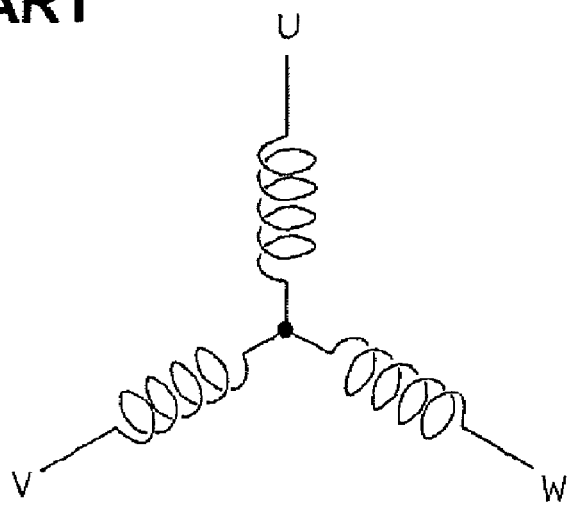
FIG. 9 is a connecting diagram of coils wound in a linear motor.

FIG. 6 shows an example of a configuration adopting a structure of a linear motor of the present invention with different positions of the salient poles. The outermost stator 52a has a salient pole 50a on the surface opposing the mover 51a. The outermost stator 52b has a salient pole 50b on the surface opposing the mover 51b. The integral stator 52c has a salient pole 50cb on the surface opposing the mover 51a, and a salient pole 50ca on the surface opposing the mover 51b. The salient poles 50ca, 50cb are displaced by one half the pitch P in the travel direction of the mover 51 with respect to the salient poles 50a, 50b. On the other hand, magnets 64 and 59 placed on the SIDE-A, SIDE-B of the mover blocks 53, 54, 55 are arranged as shown in FIG. 6B and FIG. 6C. In other words, only the magnets on the SIDE-B shown in FIG. 7C are arranged such that the N-poles and S-poles are reversed with respect to the arrangement of magnets of an embodiment of a linear motor according to the present invention shown in FIG. 7B and FIG. 7C. It also means that the magnetic poles of the magnets are displaced by one half the pitch P. Consequently, a magnetic attractive force the same as that in FIG. 1 is generated around the mover 51, and therefore the same thrust is generated even with the structure of a linear motor shown in FIG. 6.

As described above, since the same performance of a linear motor may be obtained by a linear motor structure shown in FIG. 6, and the width of the integral stator 52c and the magnetic flux 110 generated inside the integral stator 52c are the same as those in FIG. 1, it is possible to obtain similar effects to those obtained by the present invention.

The same is true with a structure where the salient poles 50a, 50ca, 50cb are at the same positions and only the salient pole 50b is displaced by one half the pitch P, or where the salient poles 50b, 50ca, 50cb are at the same positions and only the salient pole 50a is displaced by one half the pitch P. As described hereinabove, structures where the salient poles 50 of the respective stators 52 are displaced in the travel direction of the mover 51 yield similar effects to those obtained by the present invention, and therefore such structures are included in the present invention.

While explanation had been given for linear motors having a mover 51 constructed as shown in FIG. 1 and FIG. 6 in all of the foregoing embodiments, the structure of the mover 51 is not limited thereto. The present invention is applicable to a linear motor having a different type of mover 51 structure to those shown in FIG. 1 and FIG. 6 as long as the shape of the stator 52 is the same.

What is claimed is:

1. A linear motor, comprising;
    two stators extending in parallel and having salient poles arranged at a predetermined interval on opposing surfaces,
    a mover having three types of mover blocks made up of three-phase alternating current coils configuring magnetic poles of three phases and permanent magnets arranged in alternating polarities on two surfaces of said mover blocks opposing each of said two stators, and movable between said two stators along a direction in which the stators extend,
    wherein a plurality of linear motors are arranged in parallel with respect to a travel direction of the mover, and
    the two stators provided between adjacent movers are integrally formed as a single piece stator unit such that the single piece stator unit has said salient poles on the two surfaces opposing the adjacent movers,
    when the salient poles on the single piece stator unit and the salient poles on the stators opposing the single piece stator unit are aligned in phase, the permanent magnets arranged on the two surfaces of the mover blocks opposing the stators have opposite polarities between the two surfaces, and,
    when the salient poles on the single piece stator unit and the salient poles on the stators opposing the single piece stator unit are shifted out of phase, the permanent magnets arranged on the two surfaces of the mover blocks opposing the stators have the same polarities on the two surfaces.

2. The linear motor according to claim 1, further including:
    a base contacting a bottom face of said stator for fixing said stator,
    two stator installation members provided outside of outermost stators located on the outer side in a perpendicular direction with respect to the travel direction of said mover, the outermost stators being stators of two linear motors on an outermost side of said plurality of linear motors arranged in parallel, the two stator installation members extending up to a height substantially matching a height from said base to a top face of said outermost stators, and
    two plate-like supporting members connected and fixed to a top face of said outermost stators and a top face of said two stator installation members,
    wherein said outermost stator is fixed to said base on a bottom face thereof and is fixed to said stator installation member via said plate-like supporting member on a top face thereof.

3. The linear motor according to claim 1, wherein
    the outermost stators, being stators of two linear motors on the outermost side of said plurality of linear motors arranged in parallel and located on the outer side in a perpendicular direction with respect to the travel direction of said mover, have the same shape as said integrally formed stators.

4. The linear motor according to claim 1, wherein
    said integrally formed stators are formed such that a width thereof in the direction perpendicular to the travel direction of said adjacent movers is made smaller than the sum of the widths of the outermost stators located on the outer sides with respect to the travel direction of said adjacent movers.

* * * * *